United States Patent [19]

Foret et al.

[11] Patent Number: 4,828,285
[45] Date of Patent: May 9, 1989

[54] BICYCLE FORK OR SIMILAR ARTICLE BASED ON A RESIN REINFORCED BY A TEXTILE STRUCTURE AND PROCESS FOR MANUFACTURING SAME

[76] Inventors: Regis Foret, 226 CH LE Gourd, 69290 Brindas; Yves Genin, 5 Bld, des Belges, 69006 Lyon, both of France

[21] Appl. No.: 924,576

[22] Filed: Oct. 29, 1986

[30] Foreign Application Priority Data

Oct. 29, 1985 [FR] France ................................ 85 16258

[51] Int. Cl.$^4$ .............................................. B62K 21/02
[52] U.S. Cl. .................................................... 280/279
[58] Field of Search ................... 280/279, 280, 281 R, 280/276

[56] References Cited

U.S. PATENT DOCUMENTS

| | | | |
|---|---|---|---|
| 649,633 | 5/1900 | Fauber | 280/280 |
| 4,029,172 | 6/1977 | Green | 182/46 |
| 4,493,749 | 1/1985 | Brezina | 280/281 R |
| 4,657,795 | 4/1987 | Foret | 280/281 R |

FOREIGN PATENT DOCUMENTS

| | | |
|---|---|---|
| 2308543 | 11/1976 | France . |
| 2462266 | 2/1981 | France . |
| 2546473 | 11/1984 | France . |
| 25008 | of 1893 | United Kingdom ................ 280/279 |

*Primary Examiner*—John A. Pekar
*Attorney, Agent, or Firm*—Arnold, White & Durkee

[57] ABSTRACT

This invention relates to a bicycle fork based on a resin reinforced by a textile reinforcement, in the form of a moulded assembly in one piece, forming the pivot, the fork head and the two blades, wherein the textile reinforcement is disposed around a previously formed core, the core having the configuration of the fork to be produced and being of slightly smaller dimensions in order to take into account the thickness of the reinforcement disposed around this core; and wherein the textile reinforcement is constituted, at least partly, by a superposition of bidirectional braided tubes imprisoning therebetween longitudinal yarns disposed parallel to the generatrices of said fork, said longitudinal yarns being distributed regularly over the whole periphery of the core defining the fork, both around the blades and around the fork head and the steering pivot.

8 Claims, 5 Drawing Sheets

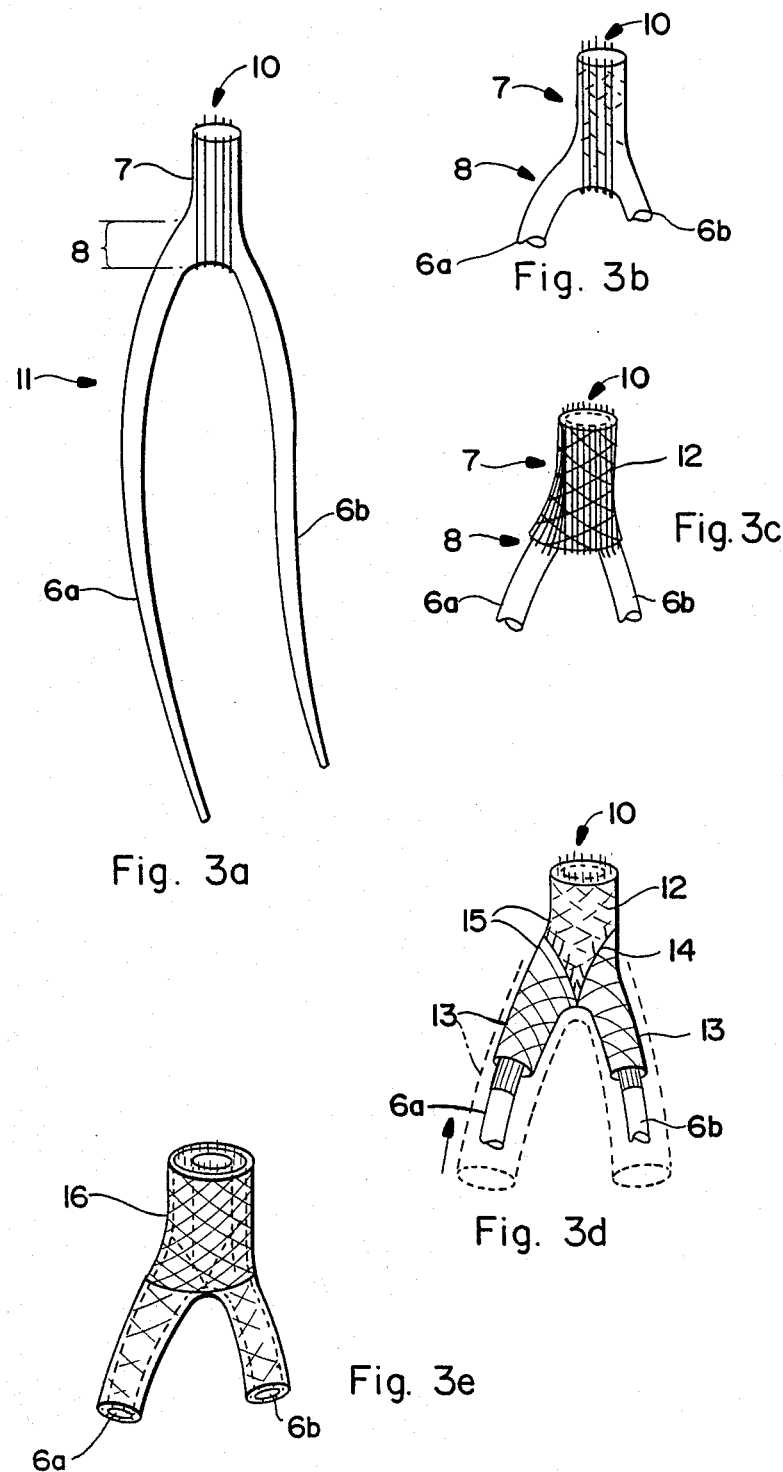

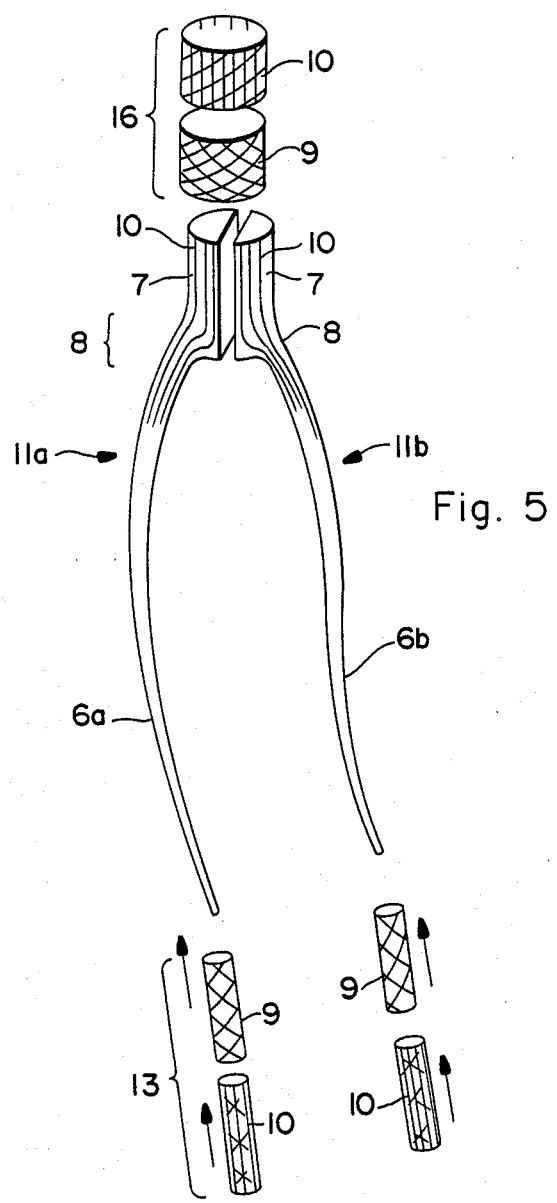

BICYCLE FORK OR SIMILAR ARTICLE BASED ON A RESIN REINFORCED BY A TEXTILE STRUCTURE AND PROCESS FOR MANUFACTURING SAME

BACKGROUND OF THE INVENTION

1. Field of the Invention

The present invention relates to a bicycle fork, or to any other like article comprising two arms connected to a common body, based on a laminated material constituted by a resin reinforced by a textile reinforcement; it also relates to a process for obtaining such a fork.

2. Description of the Prior Art

In French Patent Application No. 83 08864 (publication No. 2 546 473), Applicant described a novel type of bicycle frame based on a tubular material constituted by a resin reinforced by a textile reinforcement, formed by a superposition of braided sheaths. The different tubular elements of cylindrical or conical section are assembled together by means of sleeves.

Taking into account the advantages offered by such a material and in order to obtain a homogeneous bicycle, it might have been envisaged to produce the fork in a similar way. However, production of this element, which is essentially composed of two sectioned blades (or sleeves) at the ends of which the wheel is fixed, a head connecting the two blades and a cylindrical pivot extending the head and on which the handlebar is fixed, by applying the teachings of the above Patent, does not give satisfaction in view of the delicate technical problems to be overcome, such as for example:

the difficulty in having a perfect symmetry between the two sleeves (or blades) of the fork;

the presence of a zone of weakness at the joint between the sleeves and the head, whilst it is this zone which is subjected to the highest mechanical stresses.

In order to overcome these drawbacks, it might have been envisaged to connect the sleeves and the head by overmoulding or by adhesion. However, tests made along these lines showed that, even by selecting resins known for their excellent mechanical strength, such as for example compounds based on polyester or epoxy resins reinforced with glass fibers, it was not possible to obtain a satisfactory fork, in view of:

a lack of homogeneity at the joint, resulting from a poor distribution of the cut fibers in the structure of the workpiece;

considerable creeping due to the mechanical stresses;

very low fatigue strength of the workpieces;

necessity of overdimensioning in order to compensate a very low modulus of elasticity.

SUMMARY OF THE INVENTION

The invention enables these problems to be solved and relates to a novel type of fork in which the pivot, the head and the two blades are made in one piece, obtained directly by moulding, this fork not only being very light, but also presenting excellent characteristics of fatigue strength and resistance to bending/shear.

The novel type of fork according to the invention is generally based on a resin reinforced by a textile structure and is in the form of a moulded assembly, in one piece, forming the pivot, the fork head and the two blades, and it is characterized in that:

the textile reinforcement is disposed around a previously formed core, having the configuration of the fork to be produced and dimensions slightly smaller than said fork in order to take into account the thickness of the reinforcements disposed around this core;

the textile reinforcement is constituted, at least partly, by a superposition of bidirectional braided tubes imprisoning therebetween longitudinal yarns disposed parallel to the generatrices of said fork, said longitudinal yarns being distributed regularly over the whole periphery of the core defining the fork, both around the blades and around the fork head and the steering pivot.

According to one embodiment of the invention, the core defining the fork consists of one piece whilst, in a second embodiment, said core is constituted by two half-cores, each corresponding to a half-fork passing either through the plane of symmetry of the axis of the head and of the pivot or in a transverse plane dividing the blades (sleeves), the head and the pivot into two complementary parts; in such an embodiment comprising two half-cores, the textile reinforcements are disposed not only on the periphery but also along the zone of joining between the two half-cores, this creating a partition which improves strength further, particularly in the case of the two half-cores cut in a transverse plane passing through the blades.

The invention also relates to a process for making such a fork.

The process according to the invention generally comprises covering a previously formed core, having the configuration of the fork to be made and slightly smaller dimensions in order to take into account the thickness of the reinforcements which are disposed around this core by means of prefabricated unidirectional and bidirectional braids, the process according to the invention being characterized in that, when positioning said braids around the core, it is imperative:

that they cover not only the fork head but also that they extend over at least part of the height of the pivot;

that they imprison, in the zone constituted by the pivot, the head and at least the beginning of the blades near the head, longitudinal yarns being disposed along the generatrices of the fork;

that, after positioning of the different reinforcing braids along the blades, the head and the pivot, the latter is covered with a sleeve likewise constituted by uni- and bidirectional braids imprisoning all the layers previously disposed around the core.

According to a first embodiment of the invention, the fork is obtained from a one-piece core. In that case, the longitudinal yarns which cover the pivot, the head and the beginning of the blades are previously disposed around these zones and are maintained applied against the core by at least one layer of a bidirectional braid, the blades then being produced, likewise by means of bi- and unidirectional braids, care being taken that their ends extend along the head and part of the height of the pivot so that they overlap mutually in the zone of joining below the head.

According to the embodiment of the invention wherein the fork is made from two half-cores corresponding either to a half-fork cut along the plane of symmetry passing through the axis of the pivot, or to a half-fork cut along a transverse plane passing both through the axis of the pivot and through a plane common to the two blades, the different layers of textile reinforcement, also constituted by uni- and bidirectional braids, are firstly disposed around each of the two half-cores and then the two half-cores thus covered are juxtaposed and again covered with a succession of uniand bidirectional layers which not only ensure maintenance of the two half-cores during the moulding operation but also give said fork definitive mechanical characteristics.

In such an embodiment comprising two half-cores, an internal partitioning is obtained which reinforces the structure further, particularly in the case of the two half-cores being made in a transverse plane passing through the two blades and the pivot.

The invention will be more readily understood by reading the following description with reference the accompanying drawings, in which:

BRIEF DESCRIPTION OF THE DRAWINGS

FIGS. 3a to 3e illustrate the different phases of a first embodiment for making a preform to obtain a fork according to the invention, from a core in one piece.

FIG. 5 illustrates a preform for obtaining a fork according to the invention from two half-cores passing through the longitudinal plane of symmetry X between the blades.

DETAILED DESCRIPTION OF THE PREFERRED EMBODIMENTS

Figure 1:
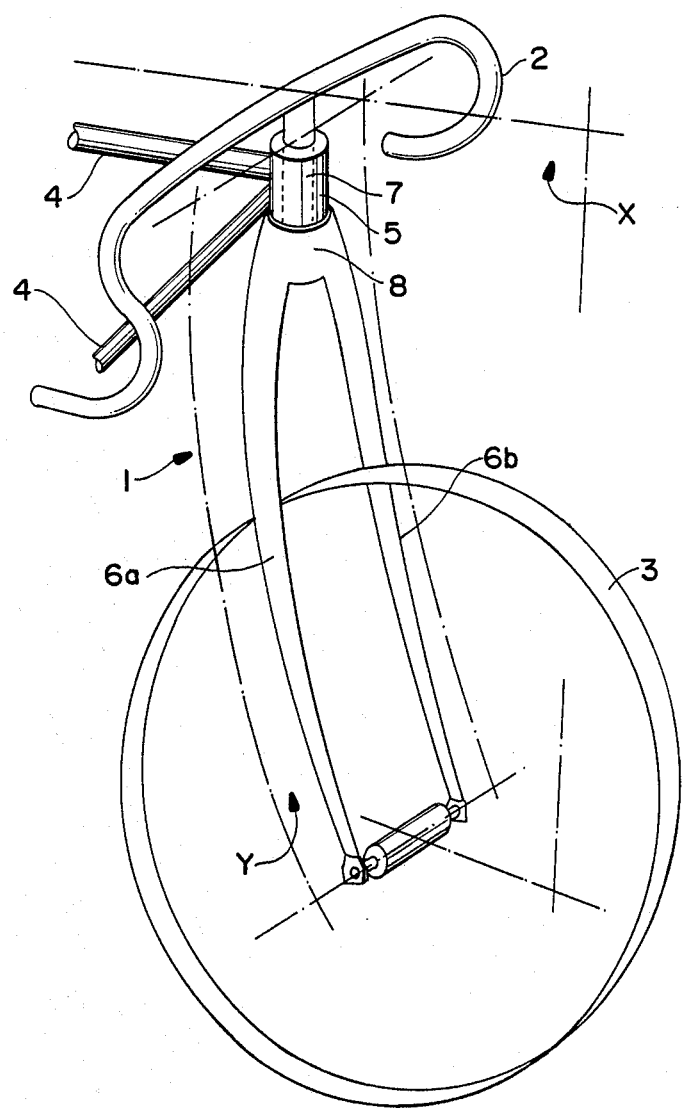
FIG. 1 is a partial view in perspective of a bicycle comprising a fork made in accordance with the invention.
Figure 2:
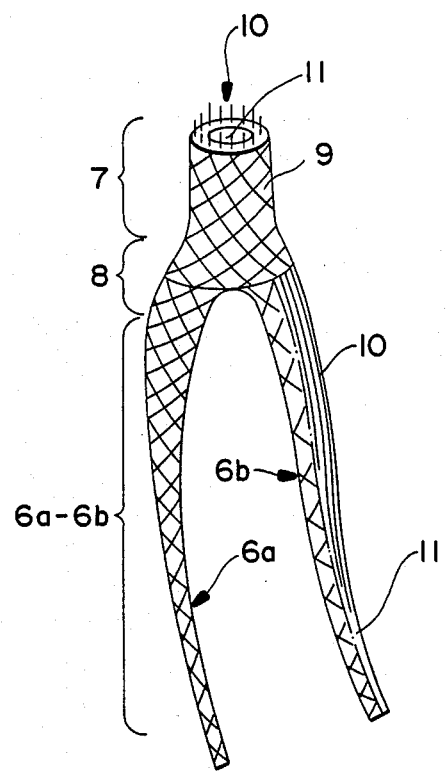
FIG. 2 is a view in perspective, partially in section, of the preform of a fork according to the invention before final moulding.

Referring now to the drawings, and firstly to FIG. 1, in a bicycle, the fork 1 which supports the handlebar 2 and the front wheel 3 is mounted on the frame 4 proper inside the steering tube 5. Such a fork 1 is essentially constituted by three principal section, namely the two blades (or sleeves) 6a, 6b between which the wheel 3 is mounted, and a pivot 7 disposed inside the steering tube 5 and at the end of which the handlebar 2 is fixed, the two blades 6a, 6b and the pivot 7 being joined together by a zone of joining 8 called the "head".

The elements forming the fork are at the present time assembled together either by welding, in the case of a fork made of steel, or possibly by adhesion, in the case of a fork based on other non-weldable materials such as for example duraluminium or composite materials based on resins reinforced by a textile structure, such an adhesion generally requiring the presence of inserts for connection between the different elements.

Contrary to the prior solutions, the fork according to the invention is made in one piece, obtained by moulding a resin reinforced by a textile armature disposed around a previously formed core, the core having the configuration of the fork to be made and being of slightly smaller dimensions in order to take into account the thickness of the textile reinforcements which will be disposed therearound. According to the invention, a superposition of layers comprising, on the one hand, yarns 9 disposed circumferentially and obliquely with respect to the generatrices of the fork and, on the other hand, and especially, longitudinal yarns 10, disposed parallel to the generatrices, over the whole periphery of the different parts of the fork, i.e. both around the blades 6a, 6b and around the fork head 8 and the steering pivot 7.

The basic textile materials allowing such a distribution and arrangement of the yarns reinforcing the resin to be obtained will preferably be constituted by bidirectional braided tubes for yarns 9 intended to be distributed circumferentially with respect to the generatrices and, for yarns 10 intended to be disposed parallel to the generatrices, by unidirectional braids, i.e. braids constituted for the major part by parallel yarns bound together by very fine, advantageously extensible yarns such as textured yarns, the binding allowing said longitudinal yarns 10 to slide with respect to one another in order to facilitate positioning thereof, as will be seen in the following specification. The yarns constituting such braids will be constituted by any yarn normally employed for making laminated materials, but preferably yarns based on carbon, yarns based on polyamide such as those marketed under the trademark "KEVLAR", each series of yarns being based either on yarns of the same nature or based on a combination of yarns of different nature such as for example alternating carbon and "KEVLAR" yarns. Any other type of yarn presenting appropriate mechanical characteristics as well as any other type of resin may, of course, also be used.

A fork of this type is made in accordance with a process which also forms part of the invention. Such a process consists in making, before moulding, a textile reinforcing structure around a core having the shape of the final fork and in which the reinforcing yarns are positioned in the manner set forth hereinabove.

To this end, different solutions are possible.

According to a first embodiment, illustrated in FIGS. 3a to 3d, a core, generally referenced 11, is made in a first mould, the core being comprised of a cellular material of the rigid or semi-rigid polyurethane foam type. The dimensions of this core will, of course, be reduced with respect to the final dimensions of the fork, as a function of the number of layers of textile reinforcements.

The different parts of this core 11 corresponding to the different parts of the fork will in the following specification be designated by the same references (6a, 6b, 7 and 8) as those used for the fork itself.

In order to obtain the appropriate distribution of the reinforcing yarns, the following method is employed.

As shown in FIGS. 3a and 3b, a band of longitudinal yarns 10, constituted by a unidirectional braided ribbon, is first disposed along the pivot 7 so as to envelop the front and rear thereof, passing beneath the fork head 8. This being done, a succession of layers 12 of bi- and unidirectional braids is wound around the pivot 7 (cf. FIG. 3c). The lengths of these bi- and unidirectional braids are such that they substantially reach the position where the blades 6a, 6b join, i.e., at the fork head 8. However, when positioning the unidirectional braids, care is taken to slide the longitudinal yarns 10 of these braids slightly so that they are applied on the beginning of the blades 6a, 6b. In general, a stack 12 comprising at least one unidirectional braid and one bidirectional braid is made. In this way, the whole periphery of the pivot 7 is therefore covered with yarns disposed both circumferentially and longitudinally.

Parts 7 and 8 of the core corresponding to the pivot and to the head thus being covered with a reinforcing structure, the blades 6a, 6b are then covered. Such covering is effected by alternately winding on each of the blades 6a, 6b (cf. FIG. 3d), a succession of uni- and bi-directional braids 13. In order to obtain the profiled form of blades 6a, 6b, the different superposed layers are of increasing length. Furthermore, during positioning, care is taken, as illustrated in FIG. 3d, to interlace the ends 14 of the braids in that part located beneath the head 8 of the fork in order to cover it entirely and to extend the ends 15 of the longitudinal yarns along the pivot 7. The blades 6a, 6b thus being formed, the pivot 7 is finished (cf. FIG. 3e), a succession of layers 16 of unidirectional braids and of bidirectional braids being formed until the outer diameter of the pivot 7 is obtained.

The preform thus made is then introduced into a second mould which has the final dimensions of the fork and where the moulding operation is carried out. The process of moulding is a conventional process consisting, after closure of the mould and placing under pressure, of preheating said mould to about 55° C. This being done, resin, for example epoxy resin, is injected into the mould and the temperature is raised up to 90°-130° C. depending on the resin used. After polymerization and cooling, the mould is opened. The piece is then trimmed, and the ends of blades 6a, 6b are cut and hollowed to allow positioning of the lugs for fixing the wheel 3. The central pivot 7 is cut to the desired height and is machined so as to allow positioning of the threaded tube for fixing the handlebar 2.

The process according to the invention may also be carried out by making the preform constituted by the core covered with the textile reinforcing structures, not from a core 11 which is in one piece, but from two half-cores 11a, 11b corresponding either to a half-fork cut along a transverse plane Y passing both through the axis of the pivot and through the plane common to the two blades (example illustrated in FIGS. 4a to 4c), or to a half-fork cut along the longitudinal plane of symmetry X between blades 6a, 6b (example illustrated in FIG. 5).

In these embodiments, the textile reinforcing structures are positioned around the cores in the following manner.

Figure 4C:
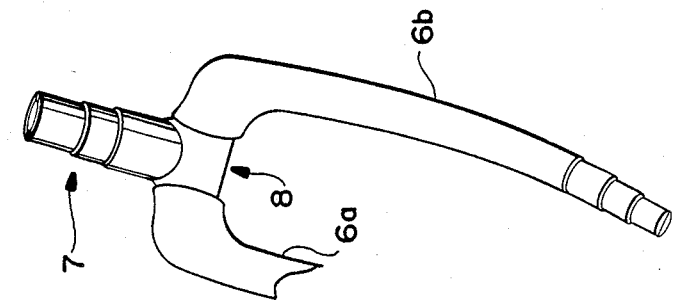
FIGS. 4a to 4c are schematic partial views in perspective illustrating the different phases of production of a preform from two half-cores adapted to be juxtaposed along the transverse plane Y passing through the axis of the pivot and the two blades of the fork.
Figure 4B:
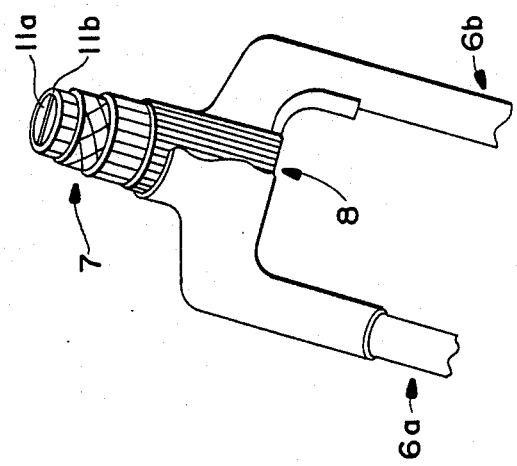
Figure 4A:
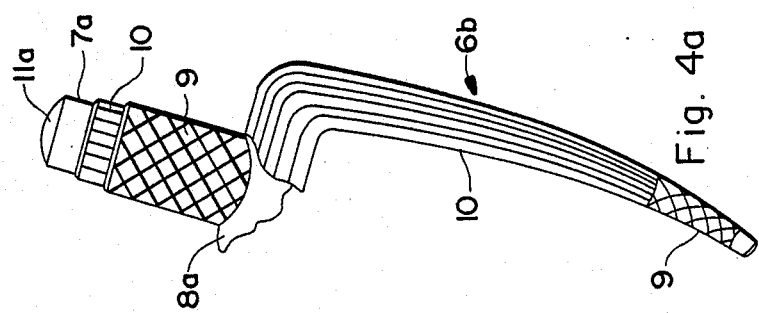

When the half-cores 11a, 11b correspond to a half-fork cut along a transverse plane passing both through the axis of the pivot and through a plane common to the two blades 6a, 6b, examples illustrated in FIGS. 4a to 4c, a succession of uni- and bidirectional braids is firstly disposed around each of the two half-cores 11a and 11b (FIG. 4a). To this end, the pivot is firstly covered with at least one layer of braids comprising longitudinal yarns 10 (unidirectional braid) and a bidirectional braid comprising circumferential yarns 9. This being done, each of the two half-blades 6a, 6b is also covered with a stack of unidirectional (10) and bidirectional (9) braids. In this way, the whole periphery of the half-pivot 7a, the head 8a and of the blades 6a, 6b is covered with yarns disposed both circumferentially and longitudinally.

The two half-forks thus being made, they are juxtaposed (cf. FIG. 4b) and the outer reinforcement of the pivot and of the fork head is then made, in a similar manner to the embodiment illustrated in FIGS. 3b and 3c, likewise by superposing uni- and bidirectional braids.

The fork head 8 and pivot 7 thus being covered, textile reinforcements of the two blades 6a, 6b are then made by covering them with uni- and bidirectional braids of increasing length (cf. FIG. 4c), care being taken to extend them along the fork head and the pivot in a manner similar to what is illustrated in FIG. 3d.

The final mould of the preform thus produced is made in a manner similar to where the core is in one piece. With respect to a fork comprising a one-piece core, such a solution makes it possible to obtain an internal partitioning between the two half-forks, which partitioning comprises both longitudinal yarns and yarns disposed obliquely and which enables the mechanical characteristics of the fork, particularly its rigidity, to be considerably increased.

In the embodiment illustrated in FIG. 5, two half-cores 11a and 11b are also used for making the fork according to the invention, these two half-cores each corresponding to a half-fork cut along the plane of symmetry X passing through the axis of the pivot. In this embodiment, the superposition of the bi- and unidirectional elements in order to obtain the configuration of the textile reinforcing structure according to the invention is made from a stack 13 of braids 9, 10. The braids have increasing lengths from pivot 7 up to the ends of blades 6a, 6b. When the half-forks are thus covered with the desired number of textile layers 13, they are juxtaposed as in the previous example and a superposition 16 of unidirectional (10) and bidirectional (9) braids is then disposed around pivot 7 until the final diameter of the pivot is obtained. The preform thus produced is then treated in a manner similar to the previous examples.

Compared with the previous examples, such a solution simplifies the process of manufacture and allows a good distribution of the yarns over the whole periphery of the fork without having to overlap the ends of the braided tubes. On the other hand, such a process requires particular care when assembling the two half-forks in order to obtain a perfect symmetry. Finally, although a reinforced internal partitioning is obtained between the two half-forks, the resistance is not as strong as in the embodiment forming the subject matter of FIGS. 4a to 4c.

The forks produced according to the invention present numerous advantages over the prior solutions, particularly in that they eliminate any operation of assembly between the blades, the fork head and the pivot. Furthermore, they present excellent characteristics of resistance to bending/shear stresses as well as an excellent resistance to fatigue.

The invention is, of course, not limited to the embodiments described hereinabove, but it covers all the variants made thereto in the same spirit.

What is claimed is:

1. A bicycle fork or like article comprising a resin reinforced by a textile reinforcement, the fork comprising a moulded assembly in one piece, said one piece forming the pivot, the fork head and the two blades,
   the textile reinforcement being disposed around a previously formed core, the core having the configuration of the fork to be produced and being of slightly smaller dimensions in order to take into account the thickness of the reinforcements disposed around said core;
   at least part of the textile reinforcement comprising a superposition of bidirectional braided tubes imprisoning therebetween longitudinal yarns disposed parallel to the generatrices of said fork, said longitudinal yarns being distributed regularly over the whole periphery of the core defining the fork, both around the blades and around the fork head and the pivot.

2. The bicycle fork of claim 1, wherein the core comprises one piece.

3. The bicycle fork in claim 1, wherein the core comprises two half-cores, each corresponding to a half-fork, the textile reinforcements being disposed not only on the periphery of said cores but also along the joint between the two half-cores, thereby creating an internal partition.

4. The bicycle fork of claim 3, wherein the two half cores correspond to halves of said fork divided along the plane of symmetry of the axis of the pivot.

5. The bicycle fork of claim 3, wherein the two half-cores each correspond to a half of a fork cut along a transverse plane dividing the blades, the head and the pivot into two complementary parts.

6. A process for making the fork of claim 1, the process comprising covering a previously formed core, the core having the configuration of the fork to be made and being of slightly smaller dimensions in order to take into account the thickness of the reinforcements which are disposed around this core, with reinforcements comprising prefabricated unidirectional and bidirectional braids, the step of positioning said braids around the core comprising:

covering said core with said braids not only on the fork head but also such that said braids extend over at least part of the height of the pivot;

imprisoning, in the zone constituted by the pivot, the head and at least the beginning of the blades near the head, longitudinal yarns disposed along the generatrices of the fork with said braids;

after positioning of the different reinforcing braids along the blades, the head and the pivot, covering the latter with a sleeve imprisoning all the layers previously disposed around the core.

7. The process of claim 6, further comprising applying at least one layer of bidirectional braids to maintain the previously disposed longitudinal yarns which cover the pivot, the head and the beginning of the blades applied against the core, the core comprising one piece, and applying over the blades, bi- and unidirectional braids, care being taken to extend ends of said braids along the head and part of the height of the pivot so that they overlap mutually in the zone of joining below the head.

8. The process of claim 6, further comprising disposing different layers of textile reinforcement comprising uni- and bi- directional braids around each of two half-cores, the half-cores together comprising the core each half-core corresponding to a half-fork cut either along the plane of symmetry X passing through the axis of the pivot, or a half-fork cut along a transverse plane Y passing both through the axis of the pivot and through a plane common to the two blades, juxtaposing the two half-cores thus covered with a succession of uni and bidirectional layers which not only ensure maintenance of the two half-cores during the moulding operation but also form an internal partition reinforcing said fork.

* * * * *